United States Patent [19]

Umeda

[11] Patent Number: 4,823,887

[45] Date of Patent: Apr. 25, 1989

[54] WORKING/ASSEMBLING DEVICE WITH SELF-CLAMPING MEANS

[75] Inventor: Masahiro Umeda, Toyota, Japan

[73] Assignee: Toyota Jidosha Kabushiki Kaisha, Aichi, Japan

[21] Appl. No.: 174,345

[22] Filed: Mar. 28, 1988

[30] Foreign Application Priority Data

Mar. 27, 1987 [JP] Japan .............................. 62-44332[U]

[51] Int. Cl.$^4$ ............................................. E21C 11/00
[52] U.S. Cl. .................................. 173/31; 74/606 R; 248/231.2; 248/231.3
[58] Field of Search ....................... 173/31; 74/606 R; 248/231.2, 231.3, 231.9, 231.91; 29/264; 81/57.24, 57.35, 57.4; 408/79, 80, 81, 83, 103, 138

[56] References Cited

U.S. PATENT DOCUMENTS 3,663,115  5/1972  Vindez et al. ..................... 408/79

Primary Examiner—Douglas D. Watts
Assistant Examiner—James L. Wolfe
Attorney, Agent, or Firm—Kenyon & Kenyon

[57] ABSTRACT

A device for applying a working or assembling process to an article at an appropriately selected position as temporarily mounted to a supporting plate through a hole formed therein, having a housing of a generally twofold tubular structure, an annular piston disposed in an annular space in said housing and adapted to be axially reciprocated by selective supply or exhaust of pressure fluid, and a plurality of cotter members arranged in the tubular housing so as to be selectively driven out of the tubular housing radially outwardly as driven by the annular piston by way of a wedging engagement with the annular piston, so that the cotter members are driven against the inner peripheral wall surface of the hole of the supporting plate with very high force available by the wedging engagement.

4 Claims, 1 Drawing Sheet

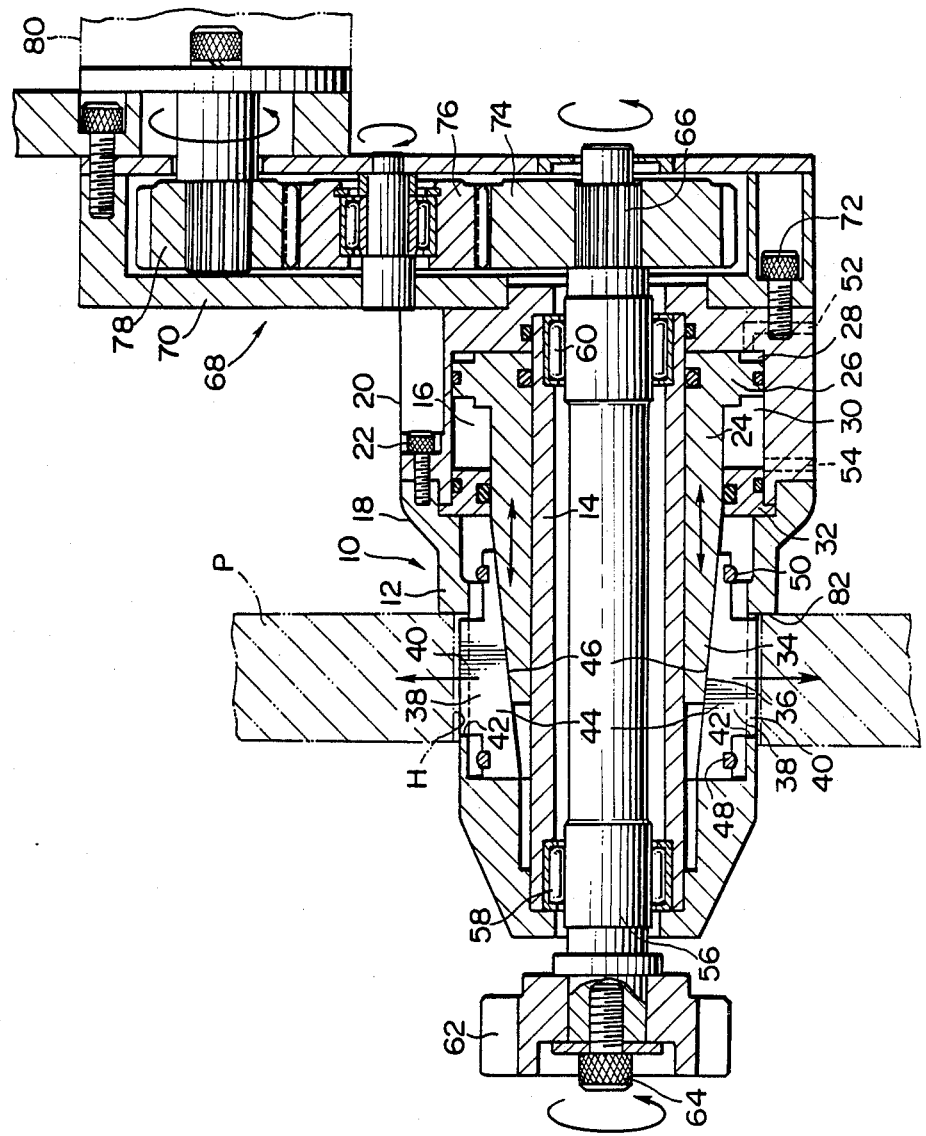

WORKING/ASSEMBLING DEVICE WITH SELF-CLAMPING MEANS

BACKGROUND OF THE INVENTION

1. Field of the Invention

The present invention relates to a device for working or assembling an article, and more particularly to a device for applying a working or assembling process to an article at an appropriately selected position as temporarily mounted to a supporting plate through a hole formed therein.

2. Description of the Prior art

In a mechanical production process of a relatively large generally mechanical article such as an automobile it is often practised that a device for applying a working or assembling process to a part of the article is set up at a position appropriately selected relative to the article as temporarily mounted to a supporting plate through a hole formed therein, such a supporting plate being also temporarily set up at a working station or temporarily mounted to a part of the article. For example, in the process of assembling a torque converter in an automatic transmission for a vehicle, for assembling together the pump impeller and the drive plate therefor with a plurality of fastening bolts angularly spaced around the central axis thereof, a supporting plate formed with a hole is provisionally mounted to an axial open end of the torque converter housing and a device having a rotary shaft supporting a pinion at a free end portion thereof and adapted to be steppedly rotationally driven for each predetermined angle is mounted to the supporting plate for steppedly driving the torque converter impeller and the drive plate for each predetermined angle for expediting the fastening process of each said fastening bolt.

Conventionally, such an assembling device was fixed to its mounting spot by manually operated clamping tools. In order to expedite the work for fastening such an assembling device to the supporting plate there has been proposed by Japanese Utility Model Publication 60-21176 an assembling device having a plurality of clamp arms adapted to be pivotably operated by an air cylinder so that the device is automatically fastened against the peripheral edge of a hole formed in the supporting plate for fixing the assembling device to the supporting plate. However, the force of clamping available by such clamping arms pivotably driven by an air cylinder is sometimes not strong enough to ensure a stable mounting of the assembling device to the supporting plate.

SUMMARY OF THE INVENTION

The object of the present invention is to provide such a device for applying a working or assembling process to an article at an appropriately selected position as temporarily mounted to a supporting plate through a hole formed therein that is quickly self-clamped to the supporting plate with high clamping force enough to ensure stable mounting of the device to the supporting plate.

According to the present invention, the above mentioned object is accomplished by a device for applying a working or assembling process to an article at an appropriately selected position as temporarily mounted to a supporting plate through a hole formed therein, comprising: a housing having a generally twofold tubular structure comprising an outer tubular wall portion engageable in said hole of said supporting plate and an inner tubular wall portion coaxially arranged at the inside of said outer tubular wall portion thereby defining an annular cylindrical chamber space between said outer and inner tubular wall portions, said outer tubular wall portion being formed with a plurality of cotter openings spaced angularly around a central axis thereof; a generally tubular plunger member disposed in said annular cylindrical chamber space and having a piston portion cooperating with said housing so as to define a first and a second pressure chamber on axially opposite sides thereof and a wedge portion having a tapered outside surface; a plurality of cotter members each being generally disposed in said annular cylindrical chamber space and slidably engaged into each one of said plurality of cotter openings so as selectively partly to project radially outwardly from each said cotter opening and having an inclined wedge surface slidably engaged with said tapered outside surface of said wedge portion of said plunger member; fluid passage means incorporated in said housing for alternatively supplying and exhausting fluid into and out of said first and second pressure chambers; a shaft member mounted through said inner tubular wall portion and supported by said housing to do a predetermined movement relative to said housing, said shaft member being adapted to support a tool for working or assembling the article at a forward end thereof projecting out from a forward free end of said housing; and a driving mechanism mounted to said housing for driving said shaft member to operate the tool.

Said housing may desirably be formed to have an annular shoulder portion located adjacent said cotter openings on one axial side thereof remote from the forward free end thereof so that the device may only be casually inserted into the mounting hole of the supporting plate until said annular shoulder portion abuts against an annular portion of the supporting plate defining the periphery of the mounting hole and the device is automatically positioned to its final axial position in the mounting hole.

In the above mentioned device it is more desirable that said plurality of cotters are resiliently driven together toward the central axis of the device by an elastic expansion ring or rings so that said cotters are automatically retracted not to project out from said cotter openings when said plunger is moved in a direction of withdrawing said wedge portion thereof from said inclined wedge surfaces of said cotters.

In the above mentioned device said shaft may be a rotary shaft rotationally supported from said housing via at least two rotary bearings spaced apart from one another long the central axis of the device.

BRIEF DESCRIPTION OF THE DRAWING

In the accompanying drawing, the single FIGURE shows an embodiment of the device according to the present invention in a longitudinal sectional view.

DESCRIPTION OF THE PREFERRED EMBODIMENT

The present invention is now described in detail with reference to the attached drawing and in terms of embodiment.

In the FIGURE, a plate P shown in phantom lines is a supporting plate formed with a hole H and provided for supporting the device herein shown as inserted and clamped in the hole H.

The device herein shown comprises a housing generally shown by 10 which has generally twofold tubular structure comprising an outer tubular wall portion 12 and an inner tubular wall portion 14 coaxially arranged at the inside of the outer tubular wall portion 12 with an annular cylindrical chamber space 16 being defined between the outer and inner tubular wall portions. In the shown embodiment, the outer tubular wall portion 12 is assembled of annular members 18 and 20 clamped together by a plurality of screws 22.

A generally tubular plunger member 24 is disposed in the annular cylindrical chamber space 16. The plunger member 24 has a piston portion 26 which defines in the annular cylindrical chamber space 16 a first pressure chamber 28 and a second pressure chamber 30 as located on axially opposite sides of the piston portion 26. An axial end of the pressure chamber 30 is defined by an annular member 32 which is firmly positioned at the shown place by an outer peripheral portion thereof being clamped between the opposed end portions of the annular members 18 and 20. The plunger member 24 further comprises a wedge portion 34 having a tapered outside surface 36.

A plurality of cotter members 38 are disposed in said annular cylindrical chamber space 16 as angularly spaced around a central axis of the tubular housing portion 10. In the FIGURE only two of them located at the uppermost portion and the lowermost portion as viewed in the FIGURE are shown. Each cotter member 38 has a tongue portion 40 engaged in each cotter opening 42 formed in the outer tubular wall portion 18 as angularly spaced around the central axis thereof. A base portion 44 of the cotter member has an inclined wedge surface 46 slidably engaged with the tapered outside surface 36 of the plunger member 24. Around opposite shoulder edges of the base portions 44 of these angularly spaced cotter members 38 there are engaged expansion spring rings 48 and 50 which are resiliently driving all these cotter members toward the central axis of the tubular housing 10 so that the inclined wedge surfaces 46 of the cotter members are always kept in engagement with the tapered wedge surface 36 of the plunger member 24. When the plunger member 24 is positioned in the retracted position as shown in the FIGURE, the cotter members 38 are retracted toward the central axis of the tubular housing and the tongue portions 40 of the cotter members are retracted not to project out of the cotter openings 42.

In the housing 10, particularly in the outer tubular wall portion 12 there are incorporated a first fluid passage 52 communicating to the first pressure chamber 28 and a second fluid passage 54 communicating to the second pressure chamber 30. These fluid passages are adapted to be connected with conduit means not shown in the FIGURE for alternatively supplying pressure fluid from a source thereof or exhausting the pressure fluid from the respective pressure chambers toward a drain means.

Through the inner tubular wall portion 14 there is provided a shaft member 56 as supported from the housing 10 by rotary bearings 58 and 60. The rotary shaft 56 bears at an end portion thereof projecting out from a free end portion of the tubular housing a pinion 62 mounted thereto by a screw 64. This pinion 62 is adapted to drive an article (not shown) such as, for example, a combination of a torque converter impeller and a drive plate of an automatic transmission for a vehicle. A rear end portion 66 of the rotary shaft 56 is adapted to be driven by a driving mechanism generally shown by 68 including a housing 70 assembled with the tubular housing 10 by clamping screws one of which is shown by 72, a gear 74 mounted on the rear end portion 66 of the rotary shaft 56, an intermediate gear 76 meshing with the gear 74, a gear 78 meshing with the intermediate gear 76 and adapted to be driven by an actuator 80 only partly shown in the FIGURE.

The device shown in the FIGURE is mounted to the supporting plate P having the hole H by the tubular housing 10 being simply inserted into the hole H from the side of the free end portion thereof so far that the tongue portions 40 of the cotter members 38 oppose the inside wall surface of the hole H of the supporting plate P. In this connection, it is advantageous to construct the outer tubular wall portion 12 to have an annular shoulder portion 82 at a position as shown in the FIGURE where the annular shoulder portion 82 just abuts against an annular portion of the supporting plate P which defines the periphery of the hole H when the tongue portions 40 of the cotter members 38 fully oppose the inner peripheral wall surface of the hole H. When such an annular shoulder portion 82 is provided in the device, the mounting of the device to the hole H of the supporting plate P is much more simplified since the axial positioning of the device relative to the supporting plate P is automatically determined.

When the device has been inserted in the hole H of the supporting plate P as shown in the FIGURE with the plunger member 24 being positioned in its retracted position also shown in the FIGURE, pressure fluid is supplied to the pressure chamber 28 through the passage 52 so that the plunger 24 is driven leftward in the FIGURE. As the plunger 24 is driven leftward, according to the wedging engagement between the tapered wedged surface 36 of the plunger member 24 and the inclined wedge surfaces 46 of the cotter members 38 the cotter members are gradually driven radially outwardly of the outer tubuler portion 12 and the tongue portions 40 of the cotter members 38 are pressed against the inner peripheral wall of the hole H of the supporting plate P. According to substantial magnification of the force by the wedge mechanism including the tapered wedge surface 36 of the plunger member 24 and the inclined wedge surfaces 46 of the cotter members 38 available at a relatively small wedge angle as seen in the FIGURE, the cotter members 38 are strongly pressed against the inner peripheral wall surface of the hole H and thereby a very firm mounting of the device to the supporting plate P is available.

When the device is to be dismounted from the supporting plate P, the pressure chamber 28 is exhausted through the passage 52, while pressure fluid is supplied to the pressure chamber 30 through the passage 54. Then the plunger member 24 is driven rightward in the FIGURE, and as the plunger member moves rightward the cotter members 38 are driven radially inwardly toward the central axis of the tubular housing by the elastic force of the expansion spring rings 48 and 50, and the clamping of the device to the supporting plate P is immediately released.

Although the invention has been described and illustrated with respect to a particular embodiment thereof, it will be apparent for one of ordinary skill in the art that various modifications with respect to the shown embodiments are possible without departing from the spirit of the invention.

I claim:

1. A device for applying a working or assembling process to an article at an appropriately selected position as temporarily mounted to a supporting plate through a hole formed therein, comprising:
   a housing having a generally twofold tubular structure comprising an outer tubular wall portion engageable in said hole of said supporting plate and an inner tubular wall portion coaxially arranged at the inside of said outer tubular wall portion thereby defining an annular cylindrical chamber space between said outer and inner tubular wall portions, said outer tubular wall portion being formed with a plurality of cotter openings spaced angularly around a central axis thereof;
   a generally tubular plunger member disposed in said annular cylindrical chamber space and having a piston portion cooperating with said housing so as to define a first and a second pressure chamber on axially opposite sides thereof and a wedge portion having a tapered outside surface;
   a plurality of cotter members each being generally disposed in said annular cylindrical chamber space and slidably engaged into each one of said plurality of cotter openings so as selectively partly to project radially outwardly from each said cotter opening and having an inclined wedge surface slidably engaged with said tapered outside surface of said wedge portion of said plunger member;
   fluid passage mean incorporated in said housing for alternatively supplying and exhausting fluid into and out of said first and second pressure chambers;
   a shaft member mounted through said inner tubular wall portion and supported by said housing to do a predetermined movement relative to said housing, said shaft member being adapted to support a tool for working or assembling the article at a forward end thereof projecting out from a forward free end of said housing; and
   a driving mechanism mounted to said housing for driving said shaft member to operate the tool.

2. A device according to claim 1, wherein said housing has an annular shoulder portion located adjacent said cotter openings on one axial side thereof remote from the forward free end thereof.

3. A device according to claim 1, further comprising at least one expansion spring ring for resiliently driving said cotter members toward the central axis of said housing.

4. A device according to claim 1, wherein said shaft is a rotary shaft and said device further comprises at least two rotary bearings for rotationally supporting said rotary shaft from said housing.

* * * * *